Patented Mar. 15, 1927.

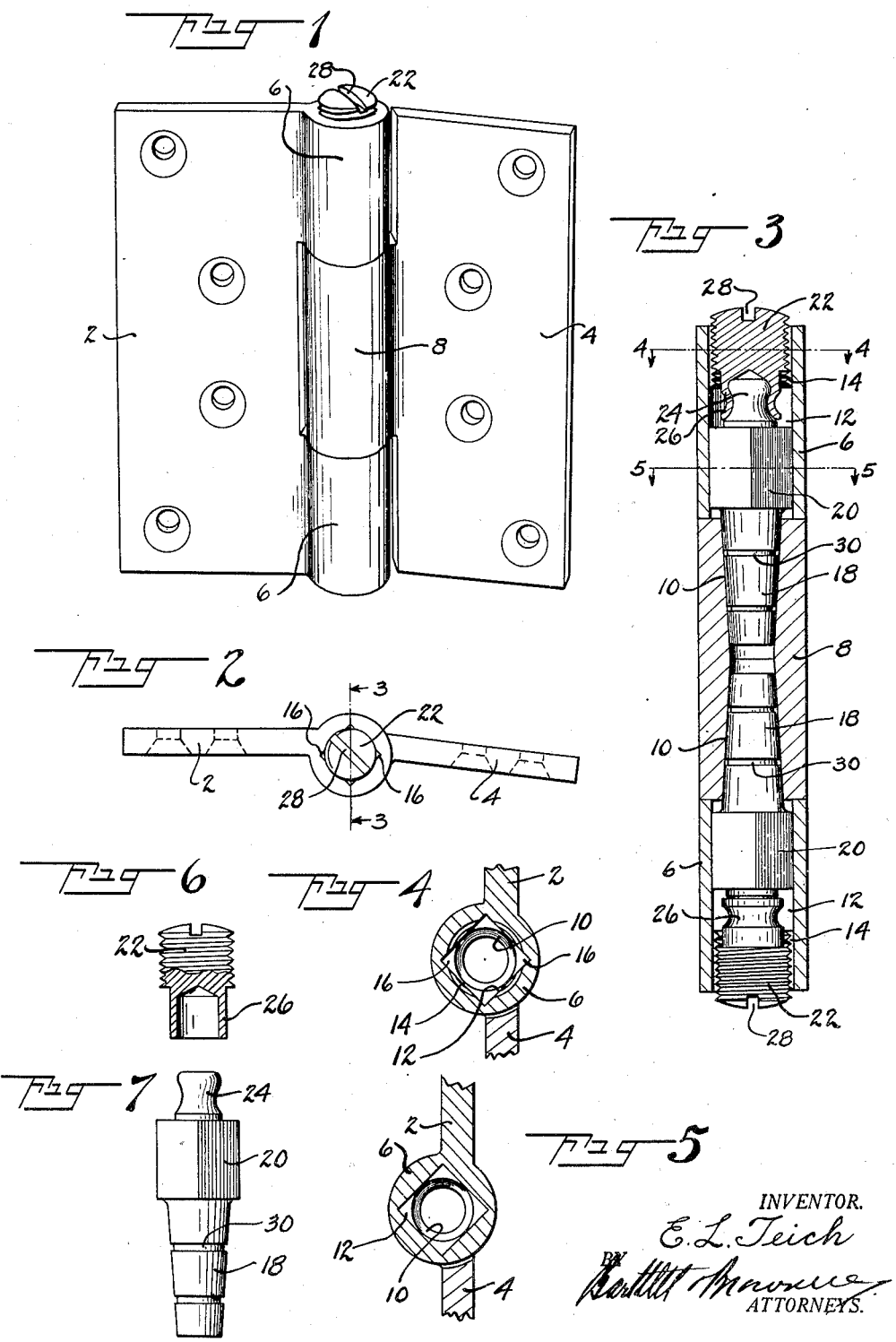

1,620,701

UNITED STATES PATENT OFFICE.

ERNEST L. TEICH, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

HINGE.

Application filed November 27, 1926. Serial No. 151,056.

My invention relates to hinges and has for its object to provide a new and improved hinge having a plurality of pintle members. It further has for its object to provide a friction hinge having a longitudinally adjustable pintle or pintles for producing the desired friction between the leaves of the hinge. The following is a description of a hinge embodying my invention reference being had to the accompanying drawings, in which:

Figure 1 shows in perspective a hinge embodying my invention;

Fig. 2 is an end view of the same;

Fig. 3 is a section on the line 3—3, Fig. 2;

Fig. 4 is a section on the line 4—4, Fig. 3;

Fig. 5 is a section on the line 5—5, Fig. 3; and

Figs. 6 and 7 are details, showing parts of the preferred form of the adjustable pintle before being assembled.

Referring more particularly to the drawings, 2 and 4 are the leaves of the hinge having knuckles 6 and 8. The knuckle 8 is provided with a bore having pintle engaging portions 10—10 while each outer knuckle 6 is provided with a bore, the inner portion of which is provided with a polygonal and preferably square surface 12, while the outer portion is screw-threaded, as shown at 14. The screw-threaded portion 14 is broached out, as shown in Fig. 4, so that it has grooves 16 in alinement with the grooves in the polygonal portion 12, so that a polygonal body fitting the polygonal portion 12 can be passed through the screw-threaded portion 14. Within and protruding from the knuckles 6 and 8 are pintle members having their inner ends 18 engaging the portions 10—10 and provided with polygonal and preferably square fixed heads 20 which fit loosely within the polygonal portions 12 and can be passed through the screw-threaded portions 14. The edges of these polygonal heads constitute splines which hold the pintles against rotation relatively to the knuckles 6. Swiveled to each pintle is a screw-threaded secondary head 22 engaging the screw threads in the portion 14. This swiveling is brought about by providing one of the members with a circumferentially recessed projection 24 around which is swaged a tubular projection 26 carried by the other swivel member, preferably the secondary head. The secondary head 22 with the tubular projection 26 before swaging, is shown in Fig. 6. In connecting these two members together the portion 26 is passed over the projection 24 of Fig. 7 and swaged or spun thereon. In making a friction hinge one or both of the portions 10—10 is made conical, and the protruding pintle end or ends engaging therewith tapered, as shown at 18.

The knuckle 8 preferably has two conical surfaces, as shown, facing in opposite directions and both knuckles 6 are preferably of the same construction as each other and each provided with an adjustable pintle, although obviously an adjustable friction hinge embodying my invention can be made with only one conical pintle. The auxiliary head 22 can be provided with any means for turning it and in the present instance I have shown a screw-driver slot 28, this being as satisfactory in many cases as a polygonal head or recess for a wrench. The pintles are preferably provided with oil grooves 30.

In assembling the hinge the knuckles are placed in alinement and the adjustable pintles are inserted longitudinally through knuckles 6, the auxiliary heads 22 being revolved so as to engage the screw thread 14 and move one or both pintles toward the center of the knuckle 8 until the desired friction is obtained. The heads 22 secure the pintle members within the outer knuckles and permit either or both pintles to be adjusted for the desired friction. The pintles themselves are held from rotary movement relatively to the knuckles 6 by the polygonal heads 20 engaging the polygonal portions of the bores in the knuckles 6, so that they do not loosen or tighten as the door is swung.

As will be evident to those skilled in the art, my invention permits various modifications without departing from the spirit thereof or the scope of the appended claims.

What I claim is:

1. In a hinge the combination of two leaves having alternating knuckles, non-rotatable longitudinally movable pintle members mounted within the outer knuckles, and screw plugs within said outer knuckles holding said pintle members within their respective knuckles.

2. In a friction hinge the combination of two leaves having alternating knuckles, pintle members extending from each outer knuckle, respectively, into an adjacent knuckle, one of said pintle members being fixed against rotation but adjustable longitudinally relatively to its knuckle to vary the friction between the two leaves.

3. In a friction hinge the combination of two leaves having alternating knuckles, pintle members extending from each outer knuckle, respectively, into an adjacent knuckle, one of said pintle members being fixed against rotation but adjustable longitudinally relatively to its knuckle to vary the friction between the two leaves, and a screw-threaded member having its axis in line with the axis of said adjustable pintle member for adjusting the location thereof.

4. In a friction hinge, two leaves having alternate knuckles provided with bores, pintle members extending from the bore of each outside knuckle, respectively, into the knuckle adjacent thereto, one of said pintle members and the bore of the adjacent knuckle into which it extends being tapered, said pintle member being provided with a splined portion fitting in its outer knuckle, and means for adjusting said tapered pintle member longitudinally.

5. In a friction hinge, two leaves having alternate knuckles provided with bores, pintle members extending from the bore of each outside knuckle, respectively, into the knuckle adjacent thereto, one of said pintle members and the bore of the adjacent knuckle into which it extends being tapered, said tapered pintle member being provided with a splined portion fitting its outer knuckle, and means for adjusting said tapered pintle member longitudinally, said means consisting of a member making screw-threaded engagement with the bore of the knuckle of said tapered pintle.

6. In a friction hinge, two leaves having alternate knuckles provided with bores, pintle members extending from the bore of each outside knuckle, respectively, into the knuckle adjacent thereto, one of said pintle members and the bore of the adjacent knuckle into which it extends being tapered, said pintle member being provided with a splined portion fitting its outer knuckle, and means for adjusting said tapered pintle member longitudinally, said means consisting of a member making screw-threaded engagement with the bore of the knuckle of said tapered member and having a swiveled connection with the tapered member.

In testimony whereof, I have signed my name to this specification this 23rd day of November, 1926.

ERNEST L. TEICH.